(12) United States Patent
Bauer et al.

(10) Patent No.: US 6,735,063 B1
(45) Date of Patent: May 11, 2004

(54) POWER CIRCUIT-BREAKER

(75) Inventors: Bernhard Bauer, Regensburg (DE); Reinhard Schmid, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/647,368
(22) PCT Filed: Apr. 9, 1999
(86) PCT No.: PCT/DE99/01074
§ 371 (c)(1),
(2), (4) Date: Feb. 23, 2001
(87) PCT Pub. No.: WO99/54977
PCT Pub. Date: Oct. 28, 1999

(30) Foreign Application Priority Data

Apr. 22, 1998 (DE) ......................................... 198 18 054

(51) Int. Cl.⁷ ................................................ H02H 3/00
(52) U.S. Cl. ........................ 361/42; 361/93.1; 361/115
(58) Field of Search .............................. 361/13, 42, 36, 361/38, 93.1, 88, 114, 115

(56) References Cited

U.S. PATENT DOCUMENTS

| 4,001,646 A | | 1/1977 | Howell | |
| 5,459,630 A | * | 10/1995 | MacKenzie et al. | ......... 361/45 |

FOREIGN PATENT DOCUMENTS

| EP | 0 220 408 | | 8/1986 |
| EP | 0 655 820 | | 7/1994 |
| FR | 0367690 | A1 * | 10/1989 |

* cited by examiner

Primary Examiner—Stephen W. Jackson
Assistant Examiner—James A Demakis
(74) Attorney, Agent, or Firm—Morrison & Foerster LLP

(57) ABSTRACT

A protective switching device, such as a differential-current circuit breaker, having a corebalance transformer which monitors a line network and which, via a tripping circuit and an actuation circuit, actuates a release which is coupled to a switching mechanism in order to operate a power breaker. The invention provides that a tripping circuit, which can be tripped by means of a remote tripping signal, is connected to a transformer which can be actuated on the secondary side and whose primary side is connected to an actuation circuit of the release for remote tripping of the protective switching device.

10 Claims, 2 Drawing Sheets

POWER CIRCUIT-BREAKER

CLAIM FOR PRIORITY

This application claims priority to International Application No. PCT/DE99/01074 which was published in the German language on Oct. 28, 1999.

TECHNICAL FIELD OF THE INVENTION

The invention relates to a protective switching device, and in particular to a differential-current circuit breaker, having a core-balance transformer which monitors a line network and which, via a tripping circuit and an actuation circuit, actuates a release which is coupled to a switching mechanism in order to operate a power breaker.

BACKGROUND OF THE INVENTION

Such a protective switching device is described in (U.S. Pat. No. 4,001,646). The protective switching device is used to ensure protection against a dangerous body current in an electrical system. For example, when someone touches a live part of an electrical system, the fault current then flows via the person as a body current to ground. The circuit breaker which is used for protection against dangerous body currents safely and rapidly isolates the relevant circuits from the mains power supply when the so-called rated fault current is exceeded.

The construction of a circuit breaker is described, for example, from "etz", Volume 107 (1986), issue 20, pages 938 to 945. There, FIGS. 1 to 3 in particular show basic circuit diagrams and functional principles of a fault-current circuit breaker (FI circuit breaker) and a differential-current circuit breaker (DI circuit breaker).

FI and DI circuit breakers are constructed in a similar way from three assemblies. A core-balance transformer, through whose transformer core all the current-carrying conductors of a line network are passed induces a voltage signal in its secondary winding in the event of a fault current, and this voltage signal actuates a release which is connected to the secondary winding. For its part, the release is coupled to a switching mechanism via which, when the release is operated, the contacts of a power breaker connected in that line or in each line are opened. In the process, the FI circuit breaker draws the energy required for tripping from the fault current itself, irrespective of the mains power supply voltage, while tripping in the case of a DI circuit breaker takes place as a function of the mains power supply voltage. To this end, when a fault current occurs in the electrical circuit supplied from the line network, the signal emitted from the core-balance transformer is supplied, after amplification by means of an electronics unit that is dependent on auxiliary energy, to the DI tripping circuit of the DI circuit breaker or DI accessory.

A test device having a test button is provided for checking the serviceability of such a protective switching device for circuit breaker, which test button is normally connected between the neutral conductor (N) and a phase conductor (L1, L2, L3) of the line network. When the test button is pressed, a fault current is simulated, and the reaction of the circuit breaker is tested. In this case, the circuit breaker must trip with virtually no delay when in the serviceable state.

Furthermore, a remote release is frequently provided in such circuit breakers, via which—for example for disconnection—the circuit breaker and thus the power breaker coupled to it can be operated externally. In order to provide a remote release for a DI circuit breaker, one option is for a mate contact to be connected in parallel with the test contact via a remote tripping line connected to said DI circuit breaker. Another option is for a separate winding to be provided in addition to the test winding on the core-balance transformer. The separate winding is connected between two external conductors or between one phase conductor and the neutral conductor via a current limiting resistor, for operation of a remote tripping switch. These two versions for remote tripping on the one hand also require at least one auxiliary contact, however, in a disadvantageous manner. On the other hand, the feeders to the remote tripping switch and the switch contact for the remote release must be designed for a particularly high withstand voltage.

In the case of a DI accessory for power breakers, an additional exacerbating factor is that no auxiliary contacts can be provided owing to the switching paths accommodated in the power breaker. Since such circuit breakers are also designed with three poles, a connection between two outer conductors would also be required. Furthermore, a particular feature of DI circuit breakers or accessories is that tripping time delays of up to one second can frequently be set. Thus, if the remote release were operated according to the said variance, a relatively long tripping time would have to be taken into account—depending on the time delay setting. However, this is unacceptable with regard to emergency disconnection.

SUMMARY OF THE INVENTION

In one embodiment of the invention, there is a protective switching device including a corebalance transformer which monitors a line network and actuates a release which, via a tripping circuit and an actuation circuit, is coupled to a switch mechanism in order to operate a power breaker, wherein a tripping circuit, which can be tripped by a remote tripping signal, is connected to a transformer which can be actuated on the secondary side and whose primary side is connected to an actuation circuit of the release.

In one aspect of the invention, if the secondary of the transformer is short-circuited, the tripping circuit produces a control signal for the actuation circuit of the release.

In another aspect of the invention, the tripping circuit comprises an oscillator which is connected to the primary side of the transformer.

In yet another aspect of the invention, the oscillator is a square-wave generator whose frequency is set to between 500 Hz and 5 Hz.

In still another aspect of the invention, the protective switching device wherein the tripping circuit has a comparator which is connected on the primary side to the transformer and is connected on the output side to the actuation circuit for the release.

In another aspect of the invention, the protective switching device wherein the tripping circuit has a non-reactive resistor RS>10 kΩ which is connected to the primary winding of the transformer.

In another aspect of the invention, the tripping circuit has a reference signal source having a voltage divider which is fed from a supply voltage, via a zener diode.

In yet another aspect of the invention, a secondary of the transformer is connected to ground potential via a resistor series circuit.

In still another aspect of the invention, the actuation circuit comprises a comparator with a downstream controllable electronic switch, which is connected to the release.

In yet another aspect of the invention, the controllable switch is a transistor whose base control input is connected to the comparator and in whose collector-emitter circuit a tripping relay coil of the release is connected.

BRIEF DESCRIPTION OF THE DRAWINGS

An exemplary embodiment of the invention will be explained in more detail in the following text with reference to a drawing.

Mutually corresponding parts are provided with the same reference symbols in both figures.

DETAILED DESCRIPTION OF THE INVENTION

Figure 1:
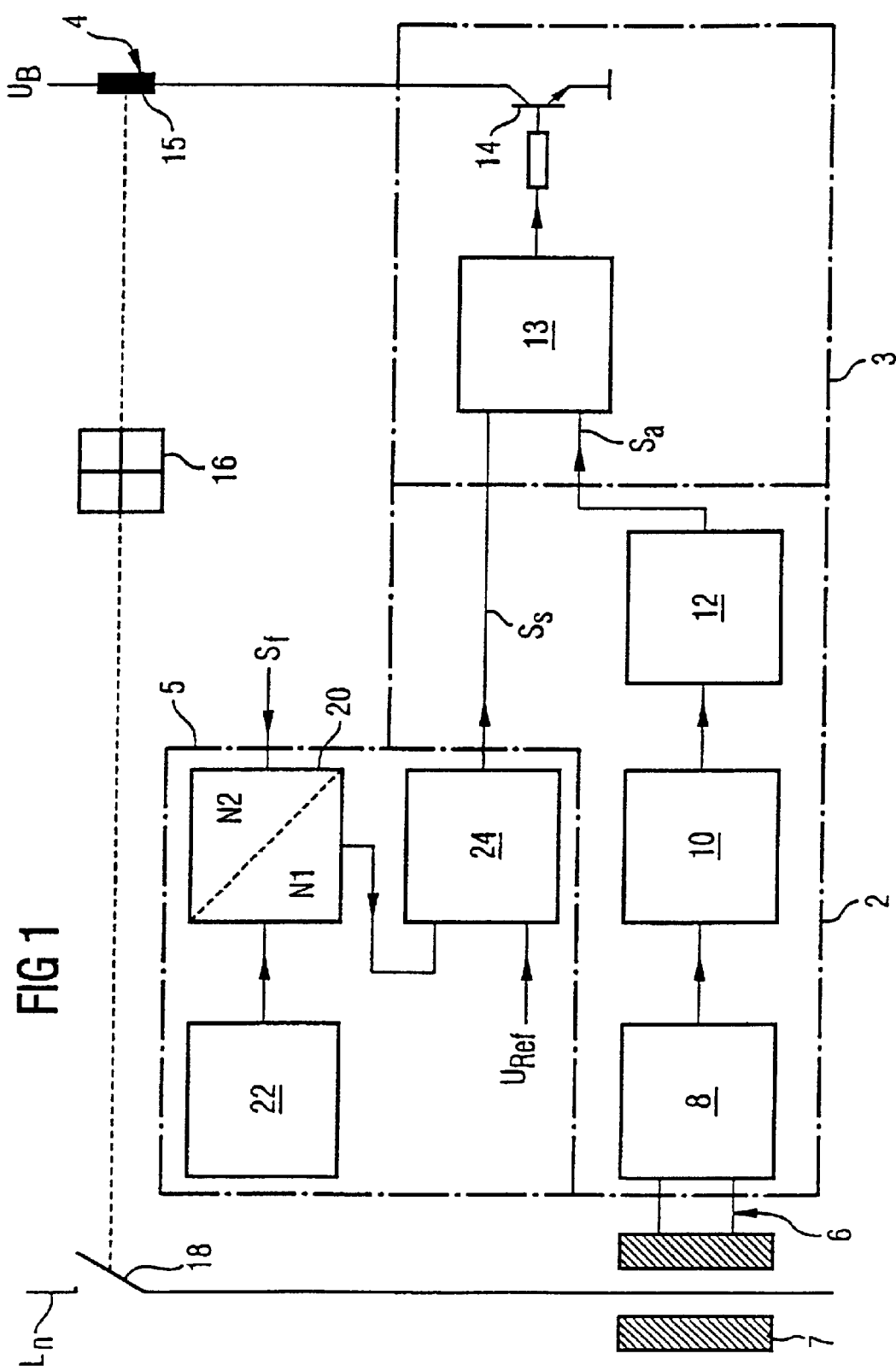
FIG. 1 shows the design of a DI circuit breaker with a tripping circuit for remote tripping.

The invention discloses a protective switching device which can be tripped remotely in a simpler and more reliable manner. The tripping circuit comprises a transformer which has a primary winding and a second winding and whose primary is connected via an actuation circuit to the release. When the transformer is actuated, circuiting its secondary winding, produces a control signal for primary side of the transformer.

The tripping circuit expediently also has an oscillator in the form of a square-wave generator, which acts on the primary winding of the transformer. In order to keep the current drawn by the square-wave generator or oscillator as low as possible in this case, the frequency, on the one hand, is chosen to be as high as possible since the inductive impedance of the primary winding of the transformer increases in proportion to the frequency. Since, on the other hand, the remote tripping line which is connected to the transformer has an impedance which becomes increasingly low as the frequency increases owing to the parasitic capacitance between the conductor cores, the frequency is expediently set to between 500 Hz and 5 kHz. The frequency levels are optimized to the assumed primary inductance of the transformer of not less than 1 Henry, preferably by short the tripping circuit the release on the and to a cable length between the transformer and a remote tripping switch of not more than 300 m.

In one embodiment, the tripping circuit has a comparator which is connected on the primary site to the transformer and is connected on the output side to the actuation circuit of the release. It is thus possible to set a response threshold for the release for remote tripping by comparing the signal on the primary side of the transformer with a reference signal in order to produce an appropriate actuation signal.

In order to limit the current flow through the primary winding of the transformer when a secondary winding is short-circuited, a non-reactive resistor is connected downstream of the comparator within the tripping circuit on the primary side of the transformer. This is particularly advantageous if the power supply for the tripping circuit is live after remote tripping. A resistor of not less than 10 kg is particularly expedient with regard to a minimum current draw.

In one advantageous refinement, the reference signal source provided to produce the reference signal within the tripping circuit has a reference voltage divider which is connected in series with a zener diode to a supply voltage. This means that the reference voltage is zero for as long as the rising operating voltage remains below the response voltage of the zener diode when the supply voltage is connected. As a result of the supply voltage being switched off, the reference voltage falls to zero when the falling operating voltage becomes less than the response voltage of the zener diode. This effectively prevents spurious tripping caused by remote tripping electronics when the voltage supply is being switched on and off.

In order to prevent an electrostatic charge on the line which is connected to the transformer for remote tripping, the secondary of the transformer is expediently connected to ground potential by a series of circuits comprising at least two non-reactive resistors.

The actuation circuit preferably has a comparator which is connected on the output side via a controllable electronic switch to the release. The electronic switch is expediently a transistor, whose control input is connected to the comparator and in whose collector-emitter circuit the tripping relay coil of a tripping relay is connected.

The invention can achieve remote tripping without any auxiliary contact by a tripping circuit which acts on the release of a protective switching device connected on the secondary side of a corebalance transformer and has a transformer whose primary is connected to the release. Furthermore, there is no need for any special requirements for the withstand voltage of the remote tripping line and the remote tripping switch. Since the tripping circuit acts directly via the actuation circuit on the release, there is virtually no delay in the actuation for remote tripping of a circuit breaker with a tripping time delay, so that safe emergency disconnection is ensured by remote tripping of the circuit breaker.

FIG. 1 shows the basic functional design of the differential-current circuit breaker as a protective switching device having a tripping circuit 2 and having an actuation circuit 3, which is fed from this tripping circuit 2, for a release 4, as well as having a tripping circuit 5 for remote tripping. The tripping circuit 2 comprises a core-balance transformer 6, through whose primary transformer core 7 all the current-carrying lines of a single-phase or polyphase line network Ln are passed. The secondary winding 8 of the core-balance transformer 6 is connected to a comparator 13 in the actuation circuit 3 via an electronic amplifier 10 with rectification and with a tripping time delay 12 connected downstream from it.

The comparator 13 is connected on the output side to a controllable electronic switch which is connected to the release 4. In the exemplary embodiment, the switch is a bipolar npn transistor 14, whose base is actuated by the comparator 13 and in whose collector-emitter circuit, which is connected to an operating voltage $U_B$, a tripping release coil 15 of the release 4 is connected. The release 4 is coupled to a mechanism in the form of a switching mechanism 16 which acts on a switching path, connected in each line of the line network Ln, of a power breaker 18.

When the DI circuit breaker is operating in the absence of any faults, the vectorial sum of the currents flowing in the two directions in the line network is equal to zero. However, if a fault current via ground occurs, for example as a result of an insulation fault in a load device (not illustrated), then this interferes with the current equilibrium in the core-balance transformer 6. The transformer core 7 is magnetized in a corresponding way to the magnitude of the fault current, so that a voltage is induced in the secondary winding 8 of the core-balance transformer 6. A corresponding amplified, rectified and a time-delay tripping signal $S_a$, is supplied to the actuation circuit 3 of the release 4. When the release 4 responds, the switching paths of the power breaker 18 are opened via the switching mechanism 16, and the damaged part of the system is consequence disconnected.

The release 4 can furthermore be actuated by remote tripping. To this end, the tripping circuit 5 comprises a transformer 20 having a primary winding N1 and a secondary winding N2, via which the tripping circuit 5 can be activated by means of a remote tripping signal $S_f$. A square-wave oscillator 22 acts on the primary winding N1 of the transformer 20. If the secondary of the transformer 20 is short-circuited, then the voltage across the primary winding N1 of the transformer 20 collapses. This is detected by a comparator 24 connected on the primary side to the transformer 20. On exceeding a reference voltage $U_{Ref}$, the comparator 24 acts on the tripping circuit 2 to actuate the tripping relay coil 15 of the release 4, by the tripping circuit 5 supplying the comparator 13 of the actuation circuit 3 with an appropriate control signal S. In this case, this action takes place after the tripping circuit 2, and thus after the tripping time delay 12, if such a tripping time delay 12 is provided.

Figure 2:
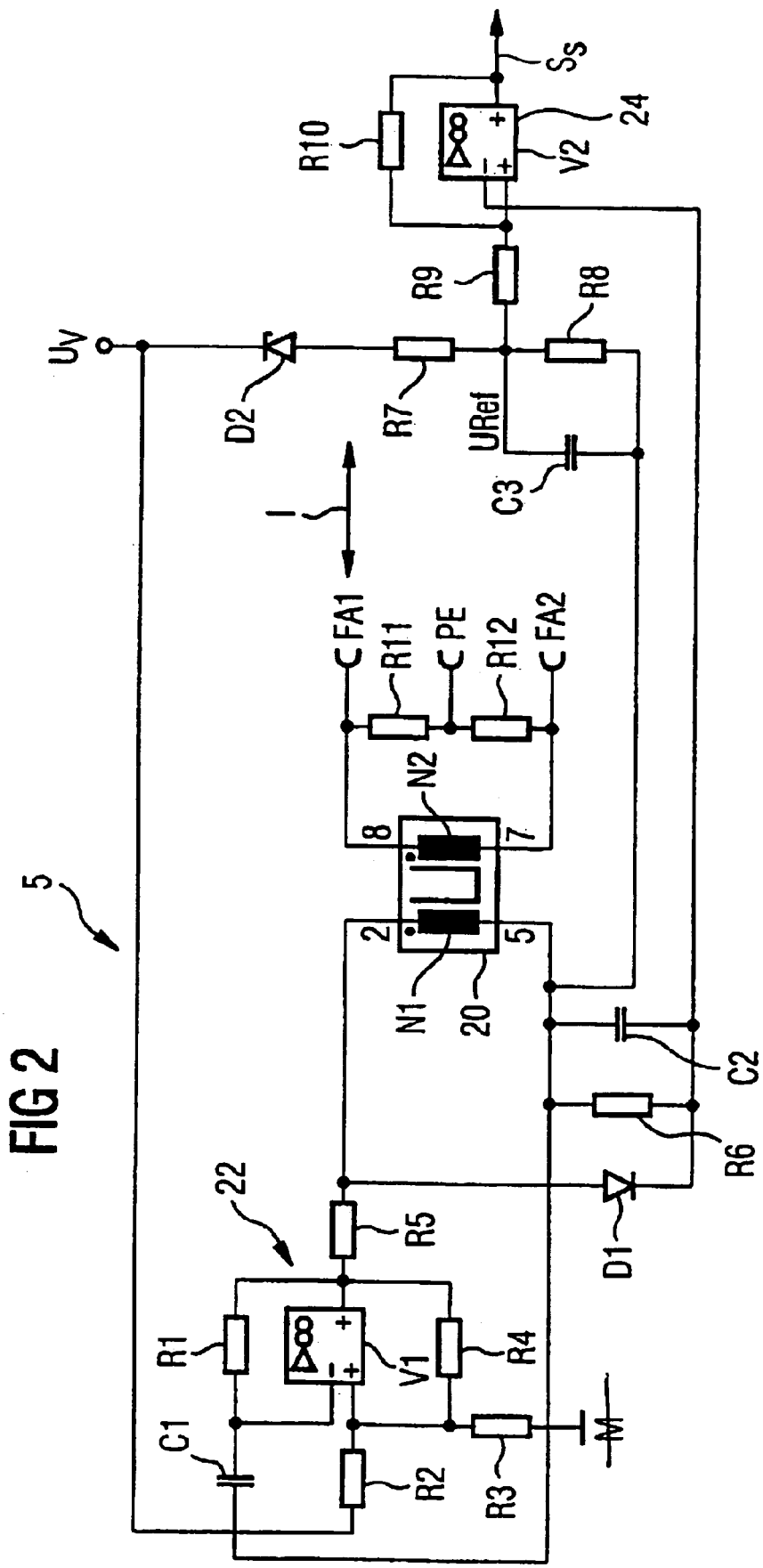
FIG. 2 shows the circuit design of the tripping circuit shown in FIG. 1.

FIG. 2 shows the design of the tripping circuit 5 for remote tripping. The transformer 20 has a voltage divider which is connected in parallel with the secondary winding N2 and is formed by two non-reactive resistors R11 and R12 which are connected to ground PE. This prevents any electrostatic charge on the remote tripping line (not shown) which is connected from the remote release to the connections FA1 and FA2.

The remote tripping lines are connected to the secondary winding N2 of the transformer 20 via connections FA1 and FA2. The square-wave oscillator 22 which is connected to the primary winding NI is formed by a comparator V1 with the illustrated circuitry comprising the resistors R1 to R4 and the capacitor C1. The frequency f of the square-wave oscillator 22 is set by appropriate dimensioning of the time constant $\tau = R1 \times C1$.

In order to keep the current drawn by the oscillator 22, and thus by the tripping circuit 5, as low as possible taking into account the impedance ($X_c = 1/2\pi fC$), which decreases as the frequency f increases owing to the parasitic capacitance between the conductor cores of the remote tripping lines, and taking into account the inductive impedance ($X_L = 2\pi fL$) of the primary winding N1, which increases with the frequency f, the frequency f is preferably set to between 500 Hz and 5 kHz. This takes into account a primary inductance $L_p \geq 1H$ which can be achieved for a minimum physical volume of the transformer 20, and a cable length 1 between the transformer 20 and a remote tripping switch (not shown) of $1 \leq 300m$.

The voltage across the primary winding N1 of the transformer 20 is rectified and smoothed by means of a diode D1 and a capacitor C2. If the secondary winding N2 of the transformer 20 is short-circuited as the result of remote tripping,-then the voltage across the primary winding N1 collapses, and the capacitor C2 is discharged via a resistor R6 connected in parallel with it. When the voltage across the capacitor C2 becomes less than the reference voltage URef of the comparator 24, which is designed as an inverting comparator V2 with hysteresis, then its output changes from low level to high level. To this end, the comparator V2 is connected to the resistors R9, R10 and to the capacitor C3 in the manner illustrated. The level change is used for controlling the actuation circuit 3 by the comparator V2 (24) supplying the appropriate control signal $S_S$ via the comparator 13 to the base control input of the transistor 14. This results in the transistor 14 being switched on, so that current flows through the tripping relay coil 15 of the release 4, which is connected to the operating voltage $U_B$ via the collector-emitter circuit of this transistor 14. A resistor R5, which is connected downstream on the output side of the comparator VI of the square-wave oscillator 22 and is located in the primary winding N1 of the transformer 20, limits the current flow via the primary winding N1 when the secondary winding N2 is short-circuited in the situation where the power supply is live after remote tripping. In order to achieve a minimum current draw, R5 should be chosen to be $\geq 10$ k$\Omega$.

The reference voltage URef of the comparator V2 is produced by means of a reference voltage divider R7, R8, which is connected to a supply voltage UV and contains a series-connected zener diode D2. As long as the rising operating voltage of the tripping circuit 5 is less than the response voltage of the zener diode D2 when the supply voltage $U_V$ is connected, the reference voltage is $U_{Ref} = 0$ V. When the supply voltage $U_V$ is disconnected, the reference voltage URef falls to 0 V when the falling operating voltage of the tripping circuits falls below the response voltage of the zener diode D2. Spurious tripping caused by remote tripping electronics when the supply voltage $U_V$ is being switched on and off is thus effectively prevented.

In an alternative method of operation of the DI circuit breaker, the secondary of the transformer 20 is short-circuited using a break contact as a remote tripping switch. Undershooting of the reference voltage $U_{Ref}$ would then result in actuation of the release 4 owing to a change in the control signal $S_S$ of the comparator 24 (V2) in the tripping circuit 5.

What is claimed is:

1. A protective switching device comprising:
   a corebalance transformer which monitors a line network and actuates a release which, via a tripping circuit and an actuation circuit, is coupled to a switch mechanism in order to operate a power breaker, wherein a tripping circuit, which can be tripped by a remote tripping signal, is connected to a transformer which can be actuated on the secondary side and whose primary side is connected to an actuation circuit of the release.

2. The protective switching device claimed in claim 1, wherein, if the secondary of the transformer is short-circuited, the tripping circuit produces a control signal for the actuation circuit of the release.

3. The protective switching device claimed in claim 1, wherein the tripping circuit comprises an oscillator which is connected to the primary side of the transformer.

4. The protective switching device claimed in claim 3, wherein the oscillator is a square-wave generator whose frequency is set to between 500 Hz and 5 Hz.

5. The protective switching device claimed in claim 1, wherein the tripping circuit has a comparator which is connected on the primary side to the transformer and is connected on the output side to the actuation circuit for the release.

6. The protective switching device claimed in claim 1, wherein the tripping circuit has a non-reactive resistor $RS \geq 10$ k$\Omega$ which is connected to the primary winding of the transformer.

7. The protective switching device claimed in claim 1, wherein the tripping circuit has a reference signal source having a voltage divider which is fed from a supply voltage, via a zener diode.

8. The protective switching device claimed in claim 1, wherein a secondary of the transformer is connected to ground potential via a resistor series circuit.

9. The protective switching device claimed in claim 1, wherein the actuation circuit comprises a comparator with a downstream controllable electronic switch, which is connected to the release.

10. The protective switching device as claimed in claim 9, wherein the controllable switch is a transistor whose base control input is connected to the comparator and in whose collector-emitter circuit a tripping relay coil of the release is connected.

\* \* \* \* \*